(12) United States Patent
Kizaki

(10) Patent No.: US 6,930,789 B1
(45) Date of Patent: Aug. 16, 2005

(54) IMAGE PROCESSING METHOD, APPARATUS, SYSTEM AND STORAGE MEDIUM

(75) Inventor: Junichiro Kizaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,196

(22) Filed: Apr. 7, 2000

(30) Foreign Application Priority Data

Apr. 9, 1999 (JP) .......................................... 11-101972

(51) Int. Cl.⁷ ............................................ G06F 15/00
(52) U.S. Cl. ...................... 358/1.15; 358/434; 358/1.9; 358/462; 382/173; 382/176
(58) Field of Search ................. 358/1.9, 1.15, 358/434, 462, 464, 468, 1.16, 401, 448; 382/173, 176, 164, 289, 291, 290, 292, 177

(56) References Cited

U.S. PATENT DOCUMENTS

| | | | | |
|---|---|---|---|---|
| 5,113,492 A | * | 5/1992 | Ariki et al. .................. | 715/520 |
| 5,719,969 A | * | 2/1998 | Taguchi ....................... | 382/311 |
| 5,949,555 A | * | 9/1999 | Sakai et al. .................. | 358/462 |
| 6,304,313 B1 | * | 10/2001 | Honma ......................... | 355/18 |
| 6,327,382 B1 | * | 12/2001 | Kaneda et al. ............... | 382/164 |
| 6,437,881 B1 | * | 8/2002 | Baba et al. .................. | 358/434 |
| 6,483,609 B1 | * | 11/2002 | Ueno et al. .................. | 358/434 |
| 6,556,711 B2 | * | 4/2003 | Koga et al. .................. | 382/173 |
| 6,661,921 B2 | * | 12/2003 | Tanioka ....................... | 382/190 |

* cited by examiner

*Primary Examiner*—Kimberly Williams
*Assistant Examiner*—Tia Carter
(74) *Attorney, Agent, or Firm*—Fitzpatrick, Cella, Harper & Scinto

(57) ABSTRACT

An apparatus for reading out a manuscript image and a data format are specified through a network, the specified data format which has been read out by the apparatus is received, and the data is subjected to the necessary processing in accordance with the data format to be outputted. When inputting and receiving an image through an image input device which can be connected through a network, the image can be received in accordance with the data format for which the subsequent editing processing can be execute while reducing the load with which the network is burdened.

37 Claims, 12 Drawing Sheets

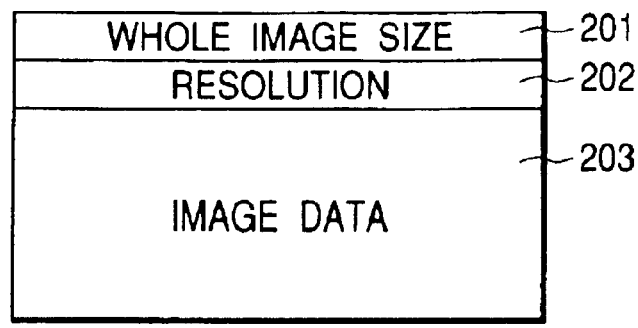
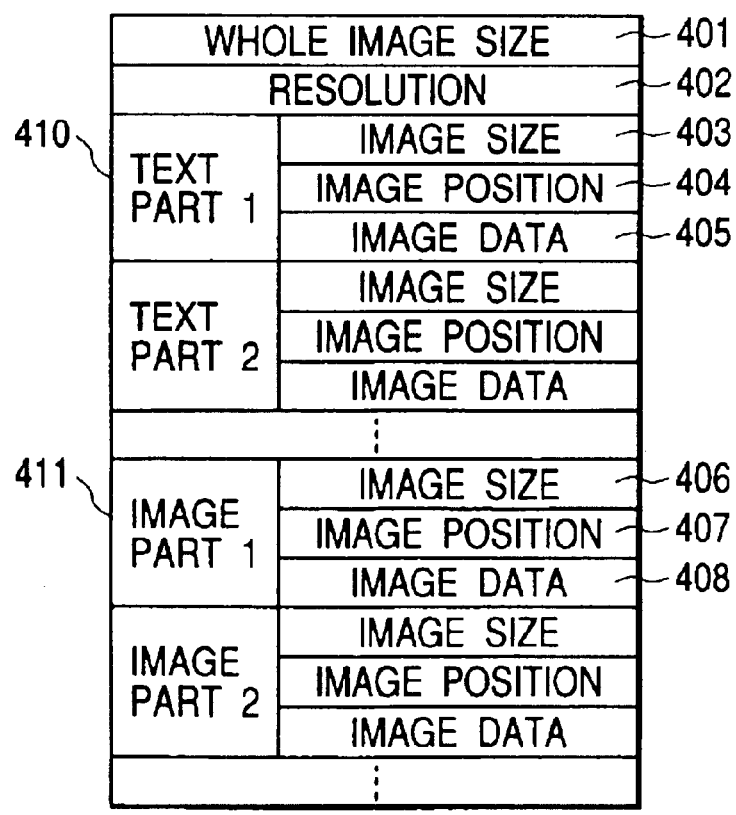

「僕にとって、長いプロローグが終わり、これからようやく本当の一幕が上がろうとしている。」鹿山哲太郎

鹿山哲太郎が国立バレエ団を退団した。天賦の才に恵まれ、若くしてカンヌバレエコンクールで金賞受賞、名門国立バレエ団でプリンシパルにまで登りつめた男が、なぜ今退団を?…「人生を自分で決めなければいけないときがある」

```
1972年    長野県松本市に生まれる
1986年    全国コンクール第一位
1988年    レニングラードコンクール金賞
1989年    ニューヨークにバレエ団設立
```

来日間近！

IMAGE PROCESSING METHOD, APPARATUS, SYSTEM AND STORAGE MEDIUM

BACKGROUND OF THE INVENTION

1. Field of the Invention

The present invention relates to an image processing when delivering data between the apparatuses which are connected to one another through a network.

2. Related Background Art

Heretofore, some of image processing apparatuses which are connected through a network can instruct a reader which is connected to other machines on the network to read out an image to receive the image thus read out through the network. In addition, in recent years, the case of handling color images has been increased so that the amount of image data has been increased. Then, when reading out the large color image to carry out the delivery of the color image through a network, it has also become possible that by taking a load of the network into consideration, the OCR (Optical Character Reader) processing of analyzing and recognizing previously the text data is executed in the machine, on the network, which has read out the image, and for the area which has been recognized as the text data, the text data after the recognition is employed instead of the image data, while with respect to the area as other than the text, the image which has been read out is transmitted by employing the image which has been compressed to be made small by the suitable compression method.

SUMMARY OF THE INVENTION

While as described above, in the prior art, it is possible to make the image data to be delivered small to reduce the load with which the network is burdened, the data which has been converted into only the text by executing the OCR processing in another machine on the network, when an error is present in the area judgement or the like, can not be corrected in the machine becoming the client which has received the data of interest. For example, when the area of the vertical writing is misidentified as the area of the horizontal writing, it is difficult that thereafter, the text data is corrected on the machine side becoming the client. In addition, when the continuous areas are respectively judged to be the different areas, after completion of the conversion into the test data, it is impossible to carry out the analysis therefor.

In order to solve the above-mentioned problems associated with the prior art, the present invention provides an image processing method, an apparatus and a storage medium, wherein data which has been transmitted from an apparatus connected thereto through a network is received; the format of the data thus received is judged; a unexecuted processing is executed for the data in accordance with the data format thus judged; and the data for which the processing has been executed is outputted.

In order to solve the above-mentioned problems, according to the present invention, preferably, the data format to be judged is the data format which is instructed to the apparatus which is connected through the network.

In order to solve the above-mentioned problems, according to the present invention, preferably, the data to be received is the data which is produced by analyzing the image.

In order to solve the above-mentioned problems, according to the present invention, preferably, the received data is the data for which the processings up to a predetermined stage of the processings of a plurality of stages have been executed, and also the subsequent processings are executed for the received data.

In order to solve the above-mentioned problems, according to the present invention, preferably, the character recognizing processing is executed for the received data.

In order to solve the above-mentioned problems, according to the present invention, preferably, further, for the data for which it is judged in the judgement step that the format of the received data is the data format which has been subjected to the area division processing, when the correction of the area division is instructed by a user, the correction of the area division is carried out.

In order to solve the above-mentioned problems, the present invention provides an image processing method, an apparatus and a storage medium, wherein an instruction of the data format issued from an apparatus which is connected through a network is received; the processings up to a predetermined stage of the processings of a plurality of stages, for image data, are executed in accordance with the data format; and the data which has been processed is transmitted to the apparatus.

In order to solve the above-mentioned problems, according to the present invention, preferably, an instruction to read out the data is received together with the instruction of the data format, and the processing of reading out the image data is started in accordance with the instruction to read out the data.

In order to solve the above-mentioned problems, according to the present invention, preferably, the processings of a plurality of stages include the data division of the image data and the character recognition.

In order to solve the above-mentioned problems, according to the present invention, preferably, the processing of dividing the area of the image data is executed.

In order to solve the above-mentioned problems, according to the present invention, preferably, the binarization processing is executed for the text area of the image data.

In order to solve the above-mentioned problems, according to the present invention, preferably, the image data is the image data which has been read out through a scanner.

In order to solve the above-mentioned problems, according to the present invention, there is provided an image processing system to which a first image processing apparatus and a second image processing apparatus are connected through a network.

wherein the second image processing apparatus, for image data, executes the processings up to a predetermined step of the processings of a plurality of stages in accordance with a predetermined data format to transmit the data for which the processings up to the predetermined stage have been executed to the first image processing apparatus; and the first image processing apparatus which has received the data for which the processings up to the predetermined step have been executed judges the data format of the received data to execute the unexecuted processing(s) for the received data to output the data for which the unexecuted processing(s) has(have) been executed.

In order to solve the above-mentioned problems, according to the present invention, preferably, the predetermined data format is the data format which is instructed from the first image processing apparatus to the second image processing apparatus.

In order to solve the above-mentioned problems, according to the present invention, preferably, the processings of a plurality of stages include the area division of the image data and the character recognition.

In order to solve the above-mentioned problems, according to the present invention, preferably, the processings up to a predetermined stage which are executed in the second image processing apparatus include the area division; and the unexecuted processing(s) where is(are) executed in the first image processing apparatus include(s) the character recognition.

In order to solve the above-mentioned problems, according to the present invention, preferably, further, the first image processing apparatus, for the data for which it is judged by the judgement means that the format of the received data is the format of the data for which the area division processing has been executed, when the correction of the area division is instructed by a user, can carry out the correction of the area division.

In order to solve the above-mentioned problems, according to the present invention, preferably, the second image processing apparatus starts the processing of reading out the image data in accordance with an instruction to read out the data which has been issued from the first image processing apparatus.

In order to solve the above-mentioned problems, according to the present invention, preferably, the second image processing apparatus executes the binarization processing of the text area of the image data in accordance with the predetermined data format.

In order to solve the above-mentioned problems, according to the present invention, preferably, the image data is the image data which has been read out through a scanner.

Other features and advantages of the patient invention will be apparent from the following description taken in conjunction with the accompanying drawings, in which the like reference characters designate the same or similar parts throughout the figures thereof.

BRIEF DESCRIPTION OF THE DRAWINGS

FIG. 2 is a diagram showing an example of structure of a general purpose image data format;

FIG. 4 is a diagram showing an example of structure of an I-PAF data format;

DESCRIPTION OF THE PREFERRED EMBODIMENTS

The preferred embodiments of the present invention will hereinafter be described in detail with reference to the accompanying drawings.

Figure 1:
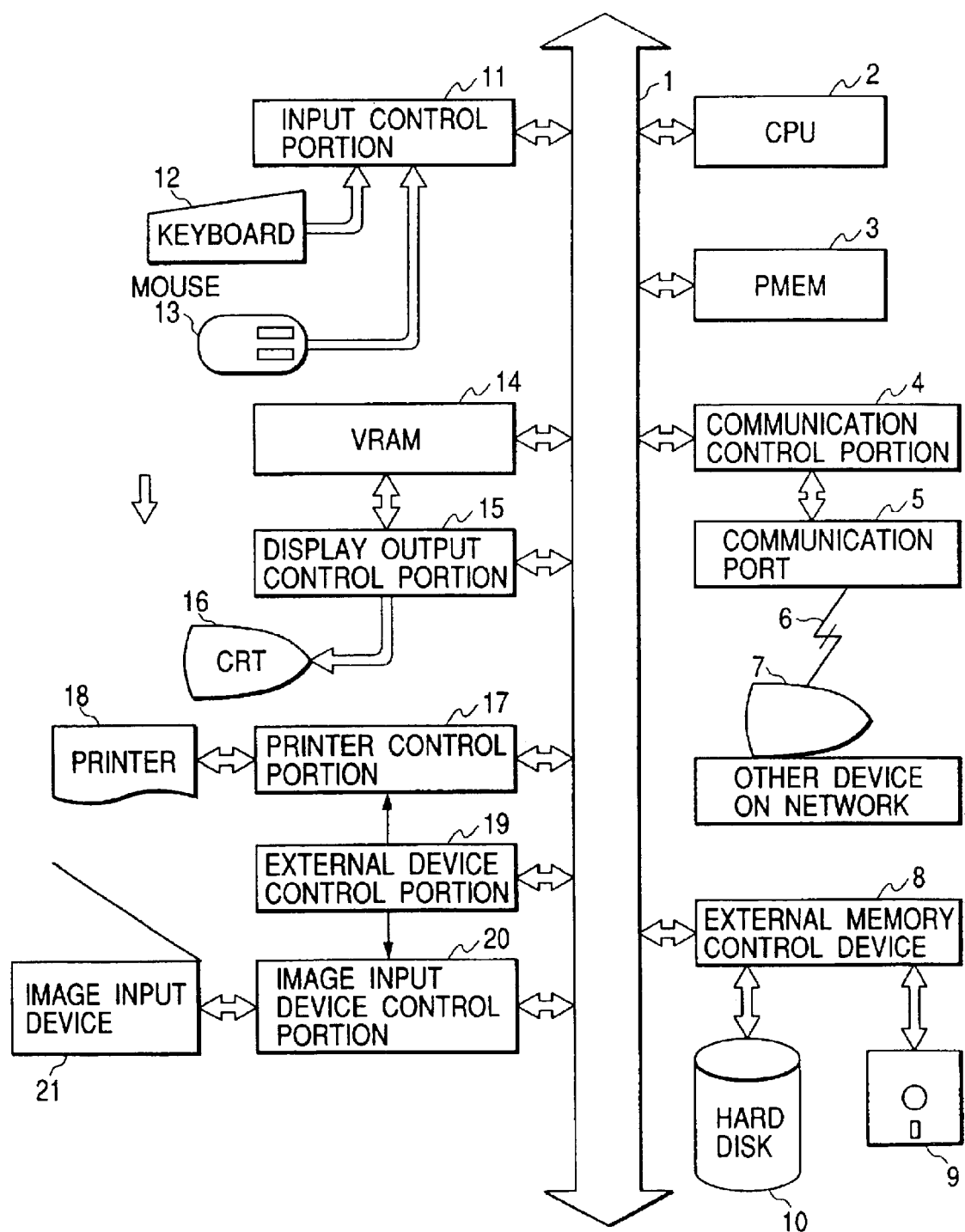
FIG. 1 is a block diagram showing a configuration of an apparatus according to the present invention.

FIG. 1 is a block diagram showing a configuration of an apparatus according to the present invention.

A system bus 1 makes possible the transmission of data between the constituent elements as will be described later. A CPU (Central Processing Unit) 2 executes the various kinds of processings according to the present invention in accordance with a control program which is stored in a PMEM 3 as will be described later. The processings which are shown in a flow chart as will described later are also executed by the CPU 2. The PMEM (memory) 3 is the memory for suitably selecting and reading out the control program for the various kinds of processings according to the present invention from a hard disk 10 to store therein the control program thus read out therefrom. The control program for the processings shown in a flow chart as will be described later is also stored in this PMEM 3. In addition, the PMEM 3, in addition thereto, functions as a text memory and hence also stores therein the text data which has been inputted through a keyboard 12 and the text data which has been read out from an external storage medium 9 or a hard disk 10 in accordance with the control made by an external memory control device 8. A communication control portion 4 carries out the control for the I/O data in a communication port 5. The communication port 5, in accordance with the control made by the communication control portion 4, is connected to a communication port 7 which another apparatus on a network has through a communication lines 6 such as a LAN or a WAN to carry out the transmission and the reception of the data. The sending of the printed data to a printer connected to the network as well as the input of the data from a scanner connected to the network are carried out through this communication port 5.

The external memory control device 8 controls the operation of reading out/writing the data from/to a memory for the data file, e.g., a hard disk (HD) 10 or an external storage medium (such as a floppy disk, an MO or a CD-R) 9 which is removably attached to the present apparatus. An input control portion 11 controls the operation of inputting the data through an input device such as a keyboard 12 or a mouse 13. In this connection, the mouse 13 may function as the coordinate inputting means through which the coordinates of the position indicated on the display screen of a CRT 16 and hence a tablet, a touch panel or the like may be employed as the coordinate inputting means instead of the mouse 13. In addition, the coordinate inputting means may have only to be able to carry out the selection and the indication on the basis of the operation of pressing down a button or a tap in the indicated coordinate position. By manipulating the mouse, the indicated position which is displayed by a mouse cursor is made in the desired position, e.g., is located on a command icon on the command menu to press down the button, whereby it is also possible to input the command which is represented by that command icon. In addition, the indication of the editing object and the indication of the drawing position can also be carried out with the mouse 13. An operator carries out the operation of inputting the character code and inputting the various kinds of operation instructions by manipulating the keyboard 12.

A video image memory (VRAM) 14 is a memory for holding therein the image which is to be displayed on a display device such as a CRT, and the display data is developed into the bit map data to be written thereto to be displayed on the CRT 16 in accordance with the control made by a display output control portion 15. In this connection, the display device is not limited to the CRT and hence may also be a liquid crystal display device. A printer control portion 17 carries out the output control for the data to a printer 18 connected thereto. The printer 18 functions as the means for printing an image and is an LBP, an ink jet printer or the like. An image input device control portion 20 carries out the control for an image input device 21 connected thereto. The image input device 21 may be either a scanner for reading optically a manuscript which is set or a film scanner. Or, the image input device 21 may also be the device for carrying out the function of reading out image data from the memory in which the image data has been stored. While in FIG. 1, the printer control portion 17 and the printer 18, and the image input device 21 and the image input device control portion 20 are shown in the form of the different constituent elements, it is to be understood that those may be either the different components or one component.

Figure 3:
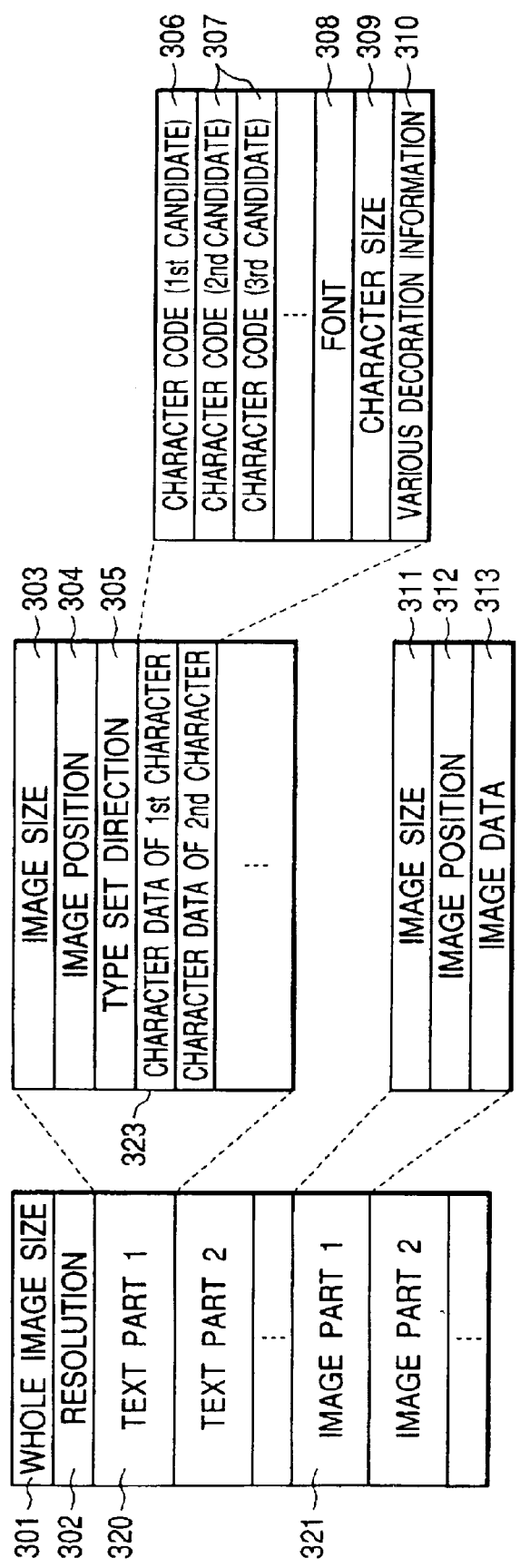
FIG. 3 is a diagram showing an example of structure of an O-PAF data format.

FIGS. 2 to 4 are respectively examples of the various kinds of data structure into which the image data is converted to be produced.

FIG. 2 is an example of a general purpose image data format.

This data format is constituted by the incidental information such as size (201) and resolution (202) of the image data, and image data (203) which has been read out. The image data part which has been read out may be the data which has been compressed by the suitable compression method in some cases. This data format is the data format which a large number of general application softwares can handle and has the wide application.

FIG. 3 is an example of the data structure after having subjected the read out image data to the OCR (Optical Character Recognition) processing. In this case, it is assumed that this data format is called the O-APT format. This data format is constituted by size (301) of the whole image data, resolution (302), and data (329, 321) every block of each of the data blocks (areas) which have been extracted on the basis of the image features of the image. The data of the area which has been judged to be the text area (the text data 320) is constituted by size (303) of that text area, a position (304), a type set direction (305) of the text in the block, and character data 323 into which the data which has been extracted from one character image is arranged. Candidate characters (306, 307) of the result of recognizing the characters, size (309) of the character, a font (308) and decoration information (310) are stored in this character data 232. Image data 321 in which the data of the area (the image area) which has not been judged to be the text area is stored includes size (311) of that image area, an image position (312) and image data (313) of that area. The image data may be compressed by the suitable compression method in some cases. In this data format, with respect to the part (such as the noise, or the background part) except for the image and the rectangular area which has been recognized as the text, it is omitted to store the data (i.e., that part is not left as the data). In addition, in the text area, the image data is not stored, but only the text data is stored. Therefore, the data size can be greatly reduced as compared with the original data.

FIG. 4 is the data structure in which the read out image data is not converted into the text, but is left as it is. In this case, it is assumed that this data format is called the I-PAF format. This data format is constituted by size (401) of the whole image data, resolution (403), and block data (410, 411) exhibiting the data of the data blocks which has been extracted on the basis of the image features of the image (the text part and the image part). Of the data blocks (the areas), text part data 410 as the data of the area which has been judged to be the text area includes size (403) of that area, a position (404) and image data (405) which has been obtained by binarizing the image data in that area. The image data 405 may become the data which has been compressed by the suitable compression method in some cases. The image part data 411 as the data of the area (the image area) which has not been judged to be the text area includes size (406) of that area, a position (407) and image data (408) in that area. The image data 408 may become the data which has been compressed by the suitable compression method in some cases. In this data format, with respect to the part (such as the noise or the background part) except for the image and the rectangular area which has not been recognized as the text, the data is omitted and in addition thereto, the image data is binarized in the text area. Therefore, the data size can be greatly reduced as compared with the original data. In addition thereto, thereafter, the image of the text area as well as the image of the image area be reproduced and also can be utilized for the editing or the like.

Figure 5:
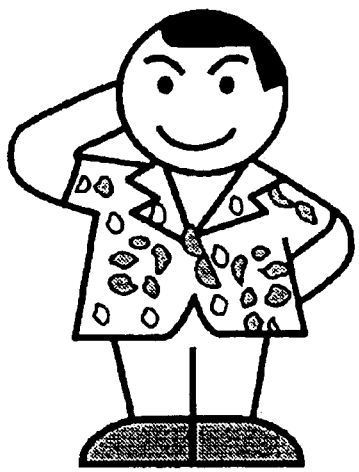
FIG. 5 is a diagram showing a sample image.

FIG. 5 is one sample of the image data.

This sample includes the data of the text, the image, the table, the graphic form and the like. This image is extracted as the rectangular area which is judged on the basis of the image features to be one unity. Each of the areas (the blocks) which have been extracted includes a text area which has been judged to be only the text, and a table area which is constituted by the text and the table (the straight lines which are drawn vertically and horizontally). Also, when the element other than the text area and the table area is included, it is judged to be the image area. With respect to the method of judging whether or not the text is included in the bloc, the well known technique is utilized.

Figure 6:
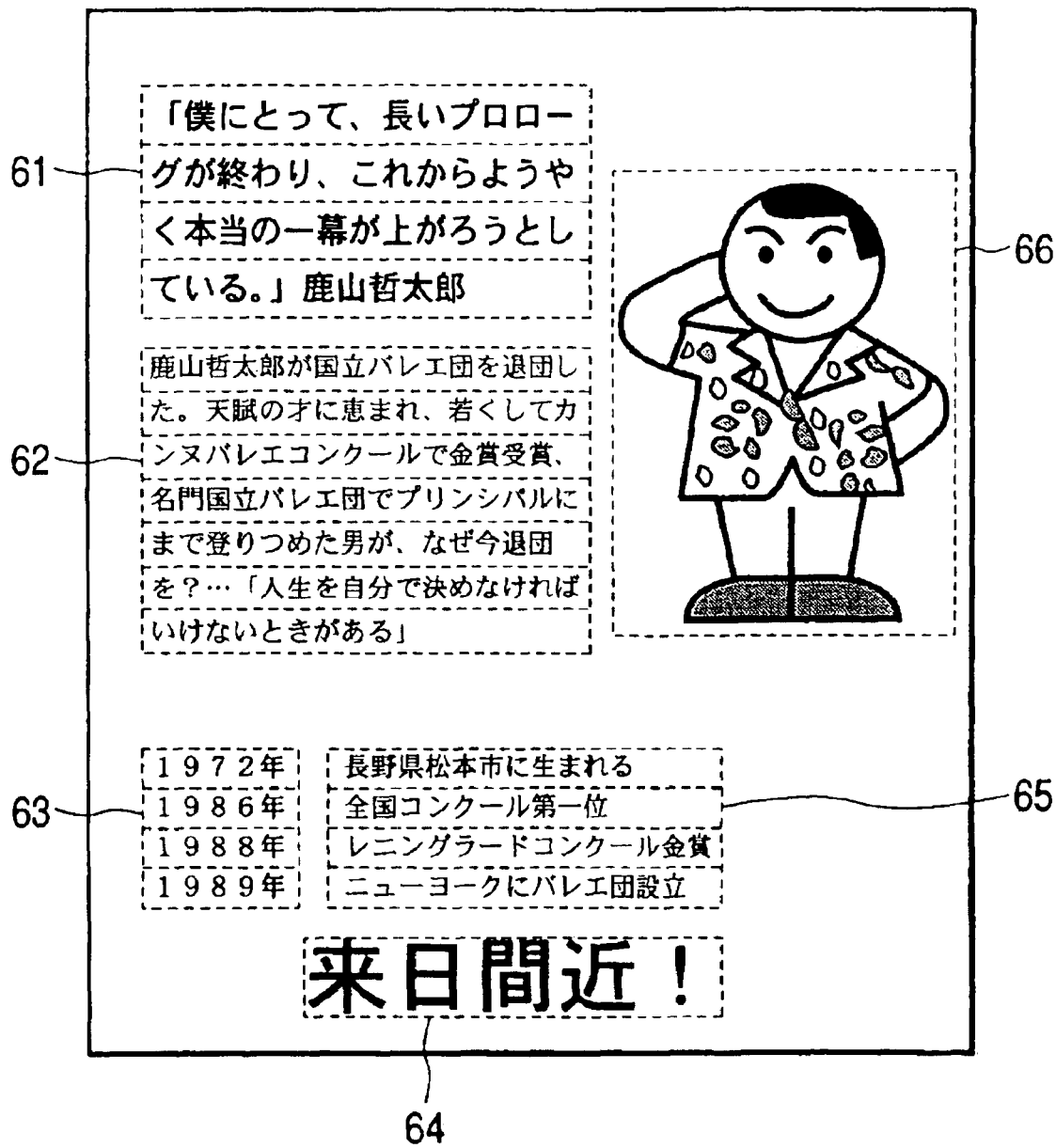
FIG. 6 is a diagram showing an example of the result of recognizing an area of the sample image.

FIG. 6 is a diagram in which each of the areas which have been extracted from the sample image data shown in FIG. 5 is indicated by the dotted line.

The block 66, in the simplified character recognizing processing, is judged not to include the text and is judged to be the image area since any of the characters is not recognized, i.e., any of the repair characters having the high similarity measure is not obtained.

A block 61 and a block 62 are extracted as the different text areas since the size of the characters in the block 61 is different from that in the block 62. A block 63 and a block 65 are extracted as the areas different from each other since the blank space between the block 63 and the block 65 is large. A block 64 is not recognized as the text, but is recognized as the image area since each of the characters is considerably thick and the size of the characters is also considerably large.

Figure 7:
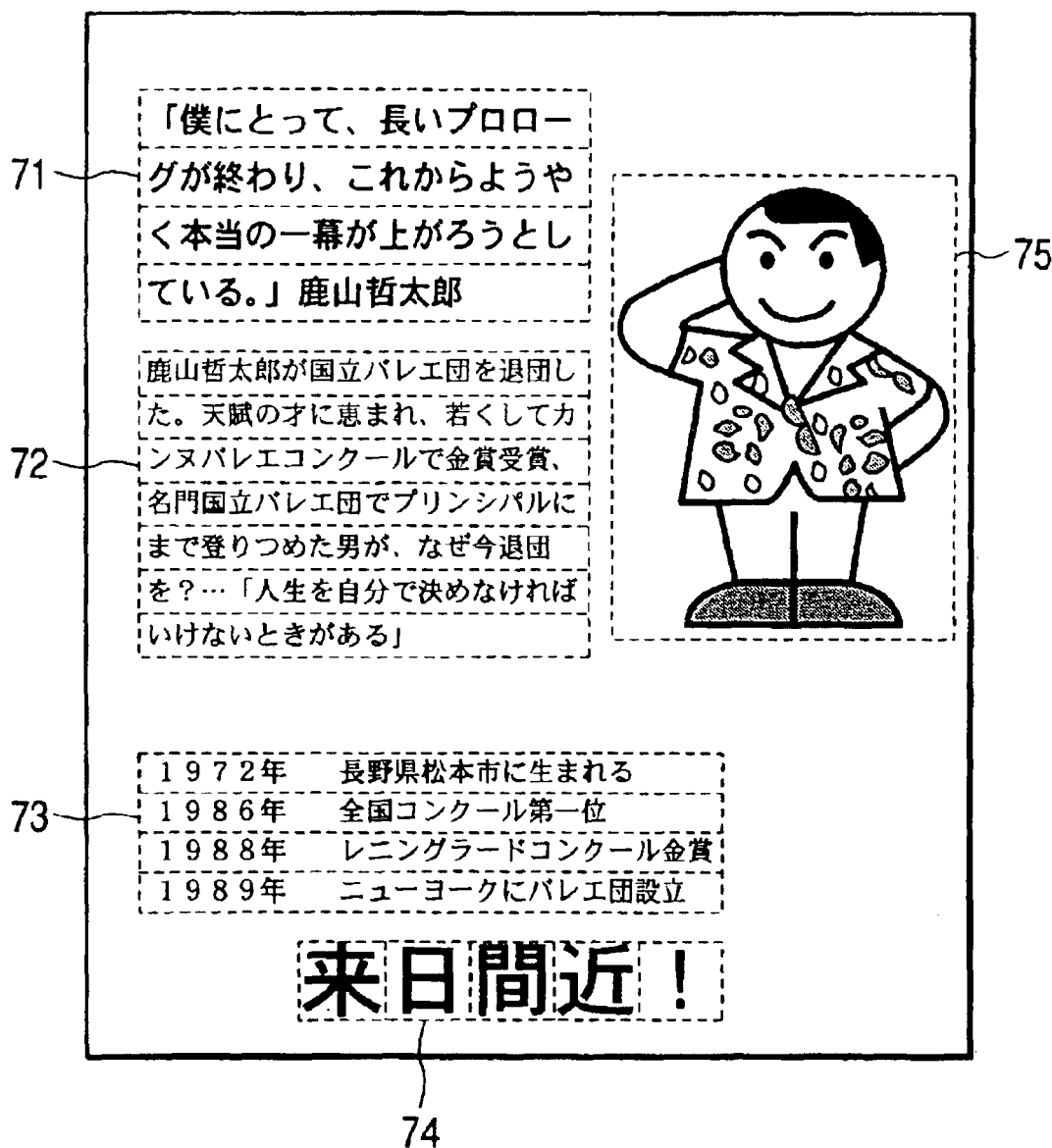
FIG. 7 is a diagram showing an example of correcting the area recognition of the sample image.

FIG. 7, in contrast with the image data in which the areas are extracted as shown in FIG. 6, is a diagram of the result of defining the areas.

The boundaries exhibiting the areas which are extracted as shown in FIG. 6, and the information exhibiting the kinds (the text, the image, the table, the graphic form and the like) which are discriminated for the areas are displayed on the CRT 16 with the boundaries and the information superimposed on the read image, and the area definition made by an operator is instructed, thereby carrying out the reperception.

Since though the block 63 and the block 65 is seemingly separated, both of the blocks are the data of one area, it is instructed to recognize the two blocks as one block (a block 73). In addition, the block 64 is specified as the text area, thereby being recognized as the text (a block 74).

Figure 8:
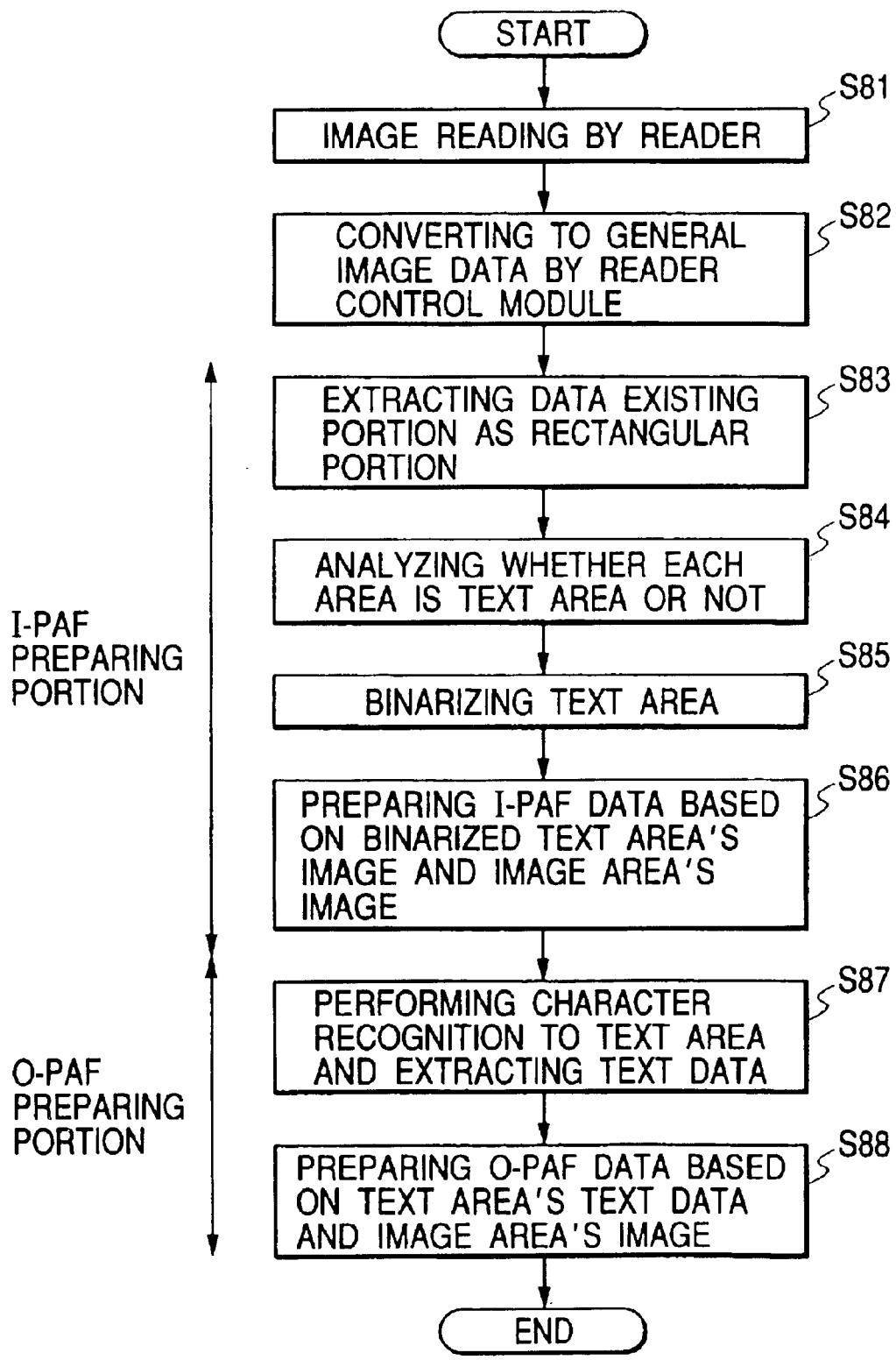
FIG. 8 is a flow chart showing the whole processing of the character recognition.

FIG. 8 is a flow chat showing the whole image analyzing processing ranging from the processing of reading out the image up to the processing of producing the O-PAF data.

The image is read out by a reader (Step S81) and then is converted into the general purpose image data format (refer to FIG. 2) by a reader control module (Step S82).

For the general purpose image data, the data existing part is extracted as the rectangular part with the blank space having no data as the break to carry out the block extraction (Step S83). The simplified character recognizing processing is executed for the image data in each of the rectangular areas to judge whether or not the image data is the area in which the texts are assembled. With respect to the area which has been judged to be the text area, the color information in that area is binarized (Step S85). The processing unit now is called the area analyzing processing, and the I-PAF data (refer to FIG. 4) is produced from the image of the text area which has been binarized and the image of the image area in which the color information is held (Step S86).

The image data of the text area for which the area analyzing processing has been executed is then subjected to the character recognizing processing (Step S87). Then, the character recognizing processing is applied to only the binarized text area. With respect to each of the character images in the area, the character code, the candidate character code, the character size, the character color and the like of the text are extracted to store those attributes together with the character code to produce the O-PAF data (Step S88). Above, the processing of the O-PAF producing portion as the character recognizing processing has been described.

Figure 9:
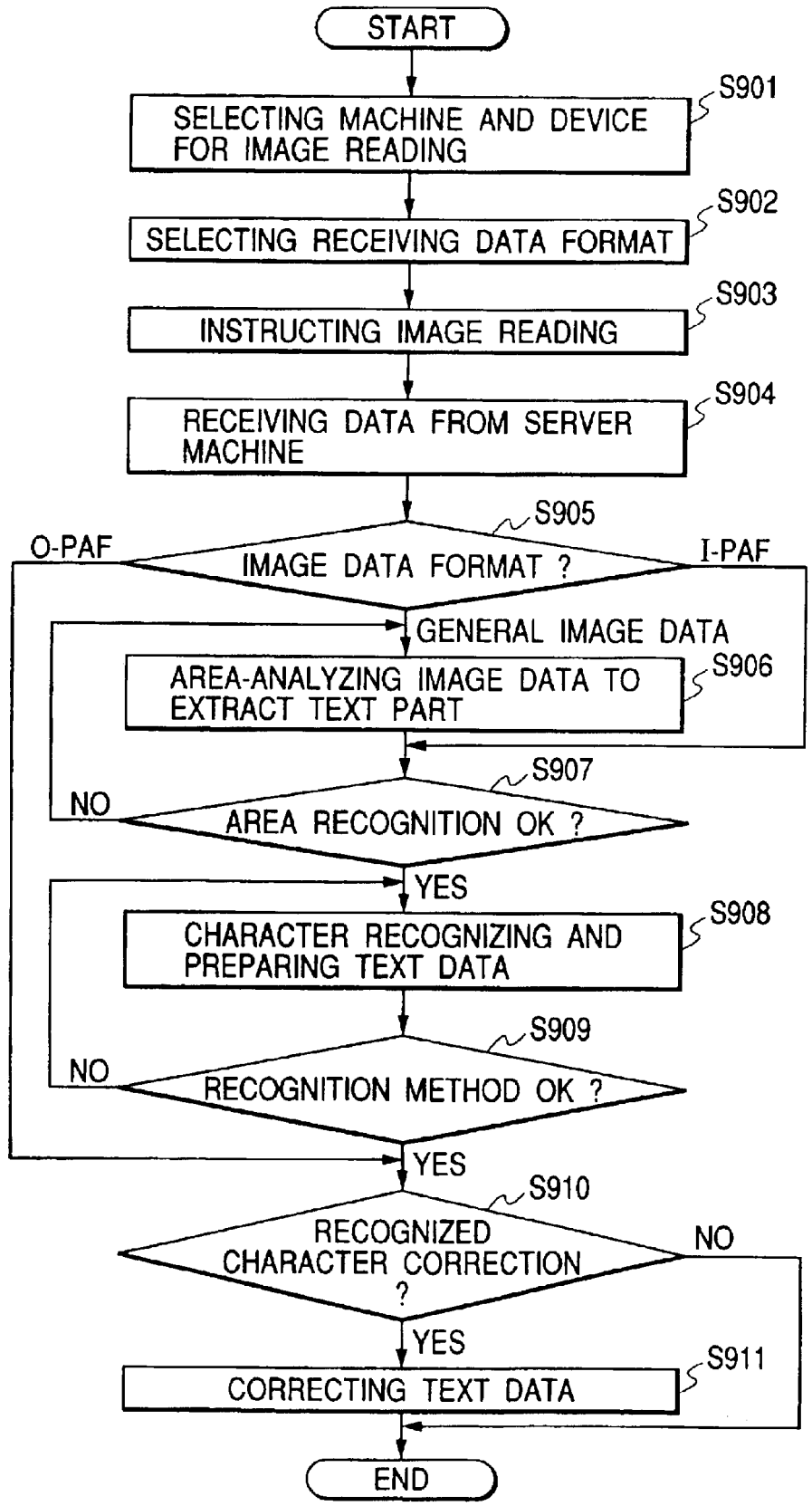
FIG. 9 is a flow chart showing the processing on a client machine side.

FIG. 9 is a flow chart showing the processing on the client machine side.

Figure 12:
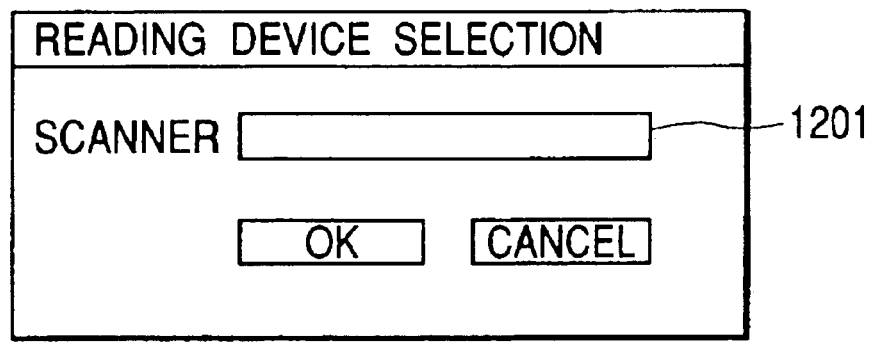
FIG. 12 is a diagram showing an example of an apparatus selection picture.
Figure 13:
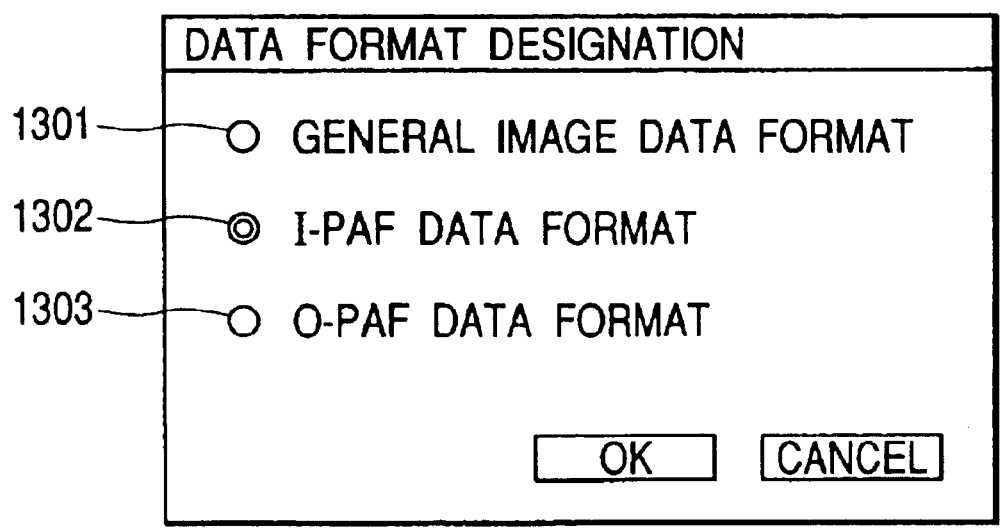
FIG. 13 is a diagram showing an example of a data format selection picture.

In the client machine, the machine (the server machine) to which the image reader for reading out the image is connected is selected among the machines on the network (Step S901). The selected picture at this time is shown in FIG. 12. The information relating to the desired reader which is connected to the network is inputted to a selection frame 201. In addition, if the data format when transferring the data from the server machine on the network to the client machine is specified (Step S902), then the picture is displayed which is used to select the data format as shown in FIG. 13 to urge an operator to select the data format which will be transferred. In this connection, the data format is selected among the following three kinds of data formats. The first data format is an image data format 1301 which is generally used. While this general purpose image data format can be handled in a large number of applications, when reading out the image with the full color, the data amount is greatly increased so that the network is burdened with the load. The second data format is an I-APF data format 1302 in which the image part which has been judged to be the text area is constituted by the data which is previously binarized by the server machine on the network, while the image part which is judged to be the image area is constituted by the data in which the color information is held. The second data format has the merit that the size of the image data can be made small as compared with the first general purpose image data format. The last data format is an O-PAF data format 1303 in which with respect to the part which is judged to be the text area, the character recognizing processing is previously executed by the server machine on the network to make that part the data of the character code. In the case of the final data format, the amount of character data can be extremely reduced as compared with the amount image data. But, when the error is present in the analysis of the area, it is impossible to correct the error by the client machine and hence the rereading is carried out again. Therefore, this may not be fitted to the complicated document in some cases. When above, the two selections in Step S901 and Step S902 have been carried out, the instruction to carry out the image reading is issued to the apparatus (the server machine) which has been selected in Step S901 (Step S903). The instruction to start the processing of reading out the image data and to specify the data format is sent to the server machine which is connected to the specified reader through the network and then the data which has been converted into the specified data format is returned back thereto (the operation, in the server machine, of reading out the image data will be described later).

The client machine receives the data which has been read out to be processed by the server in accordance with the specified method (Step S904). After the reception of the data, the format of the data which has been received, i.e., the specified data format is judged (Step S905) to execute the individual processings. First of all, when having received the general purpose image data, the area is analyzed (Step S906). The result of analyzing the area is displayed on the screen, and when unpreferable, the proper area and kind are set by the correction work by a user. In addition, in the case as well where the image data is sent in accordance with the I-PAF format, No is instructed in Step S907 so that the binarized image data is held in the text area. Therefore, it is possible to carry out again the analysis. With respect to the part which has been judged to be the different text area, it is also possible to set that part as one area or conversely to divide one area.

Thereafter, the character recognizing processing is executed (Step S908). At this time as well, the analysis result is displayed on the screen, and when it is judged by an operator that the analysis result is unpreferable, it is possible to carry out a certain kind of setting (Step S909). For example, it is possible to execute the processing of reperception of the vertical type set the area which has already been recognized as the horizontal type set.

After having executed the character recognizing processing, an operator confirms whether or not the characters become the desired recognition result (Step S901). Then, if it is confirmed that the characters do not become the desired recognition result, then an operator retrieves among the candidate characters or carriers out the reinput (Step S911). If such a correction has been completed, then the production of the document will be completed. The data thus produced is outputted to the CRT 16, the printer 18 or the external storage medium 9 in accordance with the instruction to carry out the display, the printing or the storage.

If it is judged in Step S905 that the image data of the I-PAF format has been received, then the processing proceeds to Step S907. On the other hand, if it is judged in Step S905 that the image data of the O-PAF format has been received, then the processing proceeds to Step S910.

Figure 10:
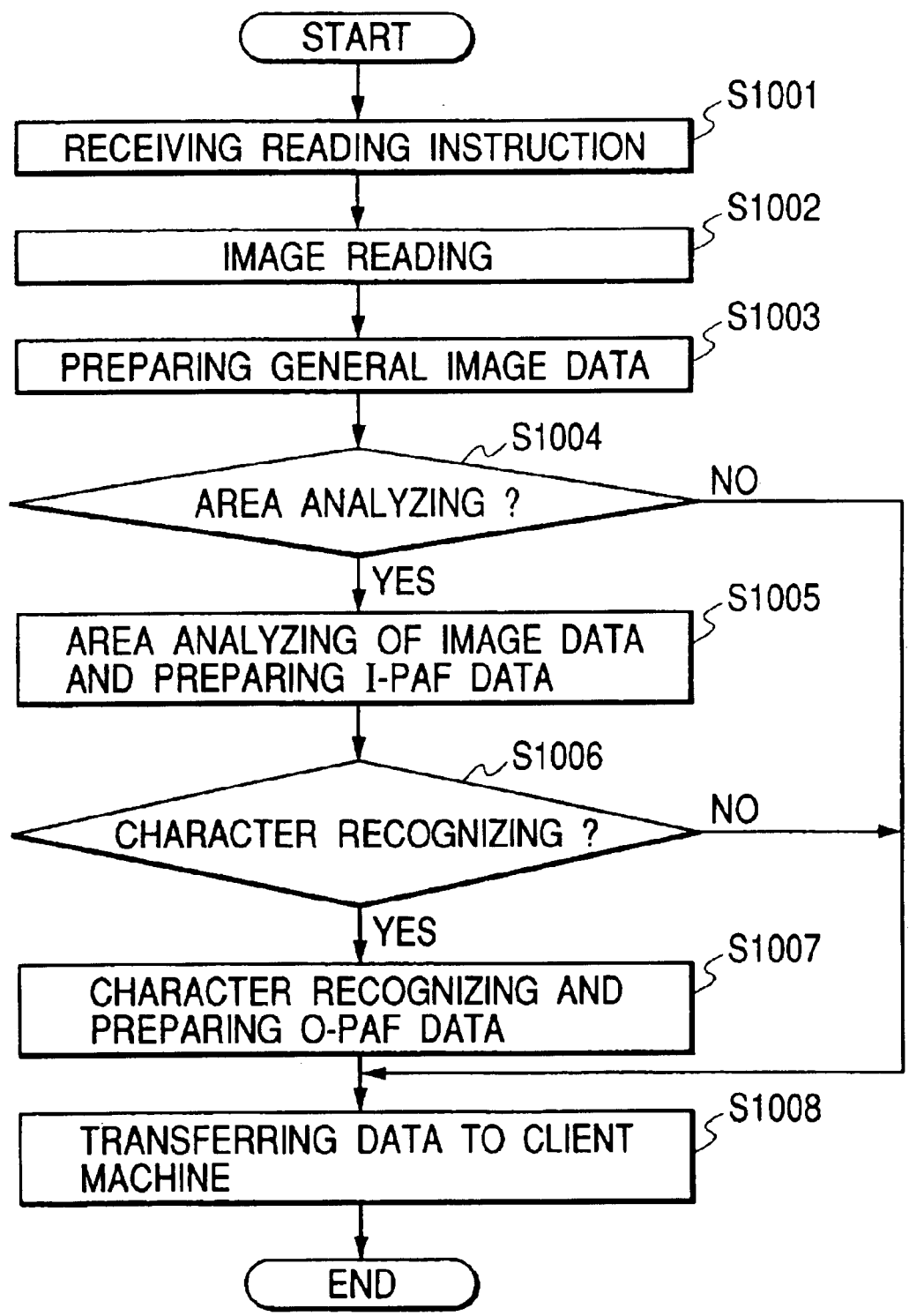
FIG. 10 is a flow chart showing the processing on a server machine side.

FIG. 10 is a flow chart showing the processing, on the server machine side, of reading out the image data in accordance with the instruction to read out the image data in Step S903.

The machine becoming the server, to which the specified reader is connected receives the specification of the format of the data to be transmitted and the instruction to carry out the image reading (Step S1001). The reader control module corresponding to the specified reader is manipulated to read out the image (Step S1002) to produce the general purpose image data (Step S1003). When the general purpose image data format is specified by the client machine, it is judged in Step S1004 that the area analysis is not carried out (NO) and the read out image data having the general purpose image data format (refer to FIG. 2) to which the size and the resolution of the image is added as the attendance information is transferred to the client (Step S1008). On the other hand, when it is judged in Step S1004 that the area analysis is carried out (YES) (Steps S1004, S1005), the part in which the data is judged to be continuous is divided as the rectangular areas. Then, it is judged whether or not each of the rectangular areas is constituted by the text, and then the rectangular area is divided into the text area and the image area. Thereafter, for the text area, the image is binarized to reduce the amount of data. The binarized text image and other images are collected and arranged to be produced as the data (refer to FIG. 4) which is constituted by the size and the resolution of the whole image, and the size and the position of each of the areas. When the data of the I-PAF format is specified from the client machine, it is judged in Step S1006 that the character recognition is not carried out (NO) and at this time point, the data is transferred (Step S1008). When it is specified that up to the character recognition is carried out, with respect to the text area, the text is recognized by the suitable character recognition algorithm to extract each of the character data (Step S1007). Each of the character data is constituted by the character size, the font, the decoration information and the like. These elements are collected and arranged into the data of the O-PAF format (refer to FIG. 3) to be transferred (Step S1008).

Figure 11:
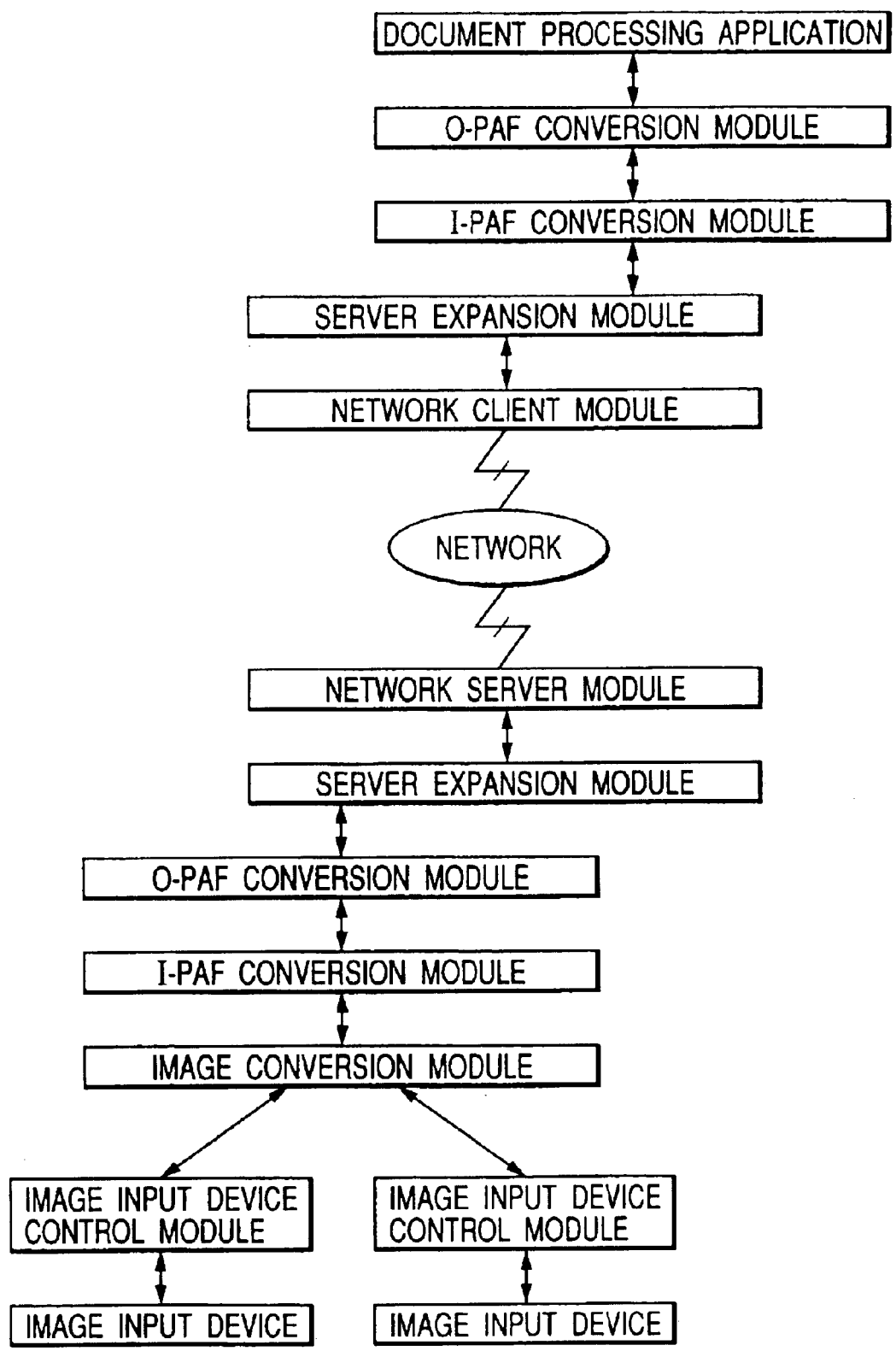
FIG. 11 is a block diagram showing a configuration of an apparatus according to the present invention.

FIG. 11 is a block diagram showing an example of a configuration of the present embodiment.

In the present embodiment, when delivering the data in the I-PAF data format, it is sufficient for the server machine to be provided with an I-PAF conversion module at the minimum and for the client machine to be provided with an O-PAF conversion module at the minimum. However, if other data format may be selected from the situation of using the network or the like, then the two processing portions need to be included in both of the server machine and the client machine.

Figure 14:
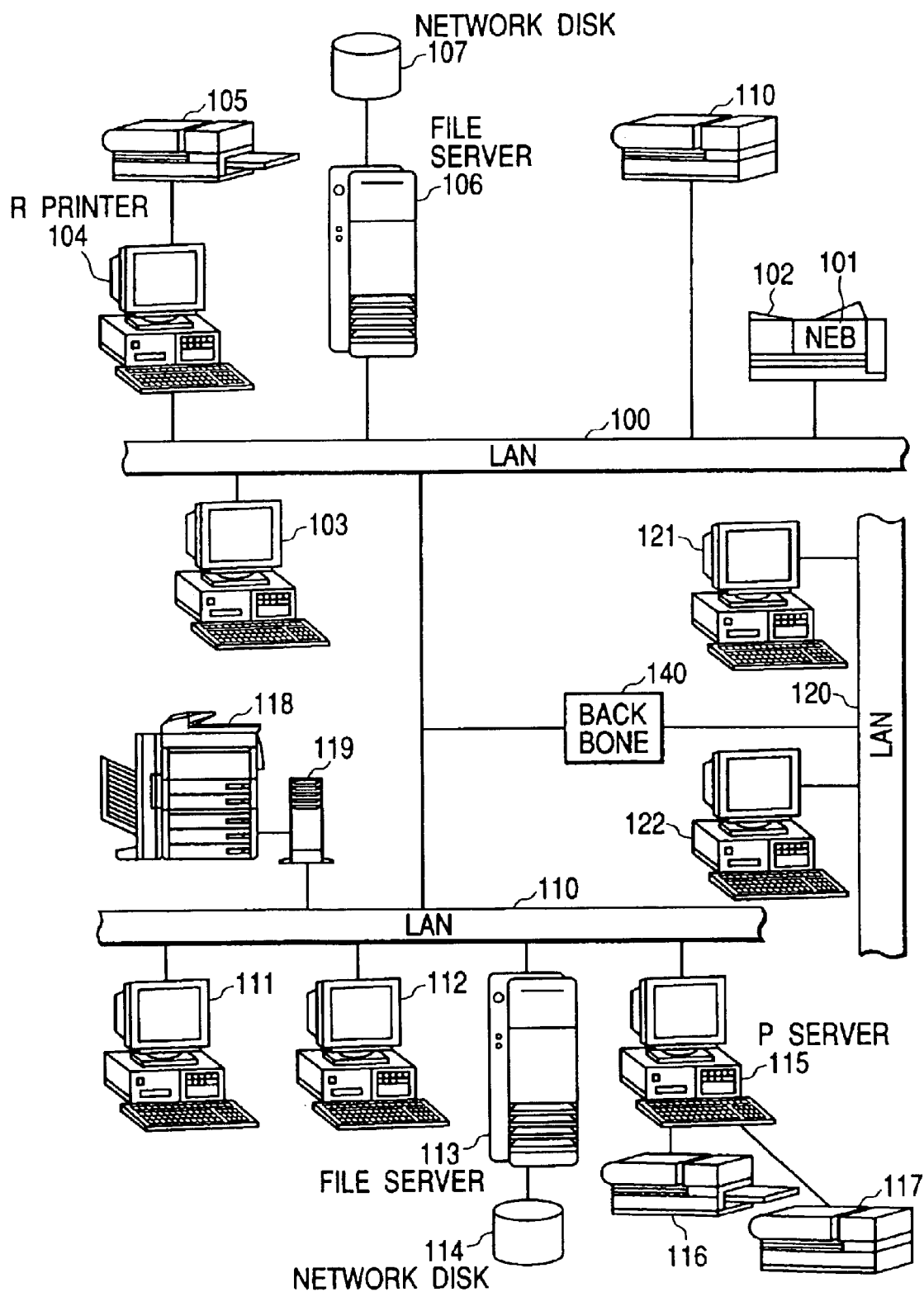
FIG. 14 is a diagram showing a configuration of a network system.

FIG. 14 shows a network system according to the present invention. The server and the client shown in FIG. 11 are realized on such a network. The network system will hereinbelow be described in detail.

FIG. 14 is a diagram showing a configuration of a network system in the case where a network board (NB) 101 through which a printer to be connected to the network is coupled to a printer 102 having an open type architecture. The NB 101 is connected to a Local Area Network (LAN) 100 through an Ethernet interface 10Base-2 having a coaxial connector, or a LAN interface, such as a 10Base-T, having an RJ-45 for example.

A plurality of personal computer (PCs) such as a PC 103, a PC 111, a PC 112 and a PC 115 are connected to the LAN. Under the control made by a network operating system, those PCs can communicate with the NB 101 and also can function as the devices which are connected to the network. In addition, for example, the PC 103 can be specified in such a way as to be used as the PC for managing the network devices. Also, the printing processing in the printer 102 or a printer 105 which is locally connected to the PC 104 may be controlled by that PC 103.

In addition, a file server 104 is connected to the LAN 100. Then, a file server 106 is accessed through the LAN 100 in accordance with the instruction which has been inputted on the display screen of the PC 104 to manage the operation of reading out/writing/storing the data from/to/in the file which is stored in a network disk 107 having a large capacity (e.g., ten billion bytes). The file server PC 104, as the file managing portion, carries out the reception, the storage, the queuing, the caching and the transmission of the data file between the LAN members. For example, the data files which have been produced by the PC 104 itself or the PC 103 are sent to the file server 106 under the control made by the file server PC 104. Then, the file server 106 arranges those data files in order and then transmits the data files thus arranged to a printer 110 in accordance with the command issued from the print server 104.

A scanner server 115 controls a scanner 117 which is locally connected thereto and a scanner 110 which is located at a distant place in such a way that the scanners 117 and 110 carry out the input of the image. A copying machine 118 is coupled to the LAN 110 through an image processing unit 119 and also functions as a scanner or a printer under the control made by the PC which is connected thereto through the network 110.

In addition, each of the PC 103 and the PC 104 is constructed by the normal PC which can carry out the generation of the data file, the transmission of the generate file to the LAN 100, the reception of the file from the LAN 100, and the display and the processing of such a file. In this connection, while the personal computer apparatuses are shown in FIG. 14, alternatively, other computer apparatuses may also be available which are suitable for executing the network software. In general, the LAN such as the LAN 100 or the LAN 110 presents the service to the rather local user group such s the user group in one floor or a plurality of floors in one building. However, alternatively, a Wide Area Network (WAN) may also be established as a certain user goes away from other users as in the situation in which a user is located in another building or another prefecture. The WAN is basically the aggregate which is constructed in such a way that some LANs are connected through the high speed digital line such as the high speed Integrated Services Digital Network (ISDN) telephone line. Therefore, as shown in FIG. 14, the LAN 100, the LAN 110 and the LAN 120 are connected through a back bone 140 to construct the WAN. Those connections are the simply electrical connections using several buses. Each of those LANs includes the dedicated PC, and while not necessarily required, in general, includes the file server and the print server. The apparatuses which are respectively connected to the LAN 100, the LAN 110 and the LAN 120 can access to the functions of the apparatus of other LANs through the WAN.

By executing the processings as described above, the analysis of the image data which has been read out is carried out; the rectangular area which has been recognized as the text area is binarized; and the rectangular area which has been recognized as the image area other than the text is compressed by utilizing some compression method or other to transmit the data with the data compressed, whereby the load with which the network is burdened can be reduced, and also even when the area division has been wrongly carried out, the editing such as the reanalysis of the area can be carried out on the client machine which has received the data.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A method of controlling a receiving apparatus which processes an image, said method comprising the steps of:
   receiving data of the image, the data being transmitted from a transmitting apparatus which is connected through a network;
   judging a format of the data received in said receiving step, the format indicating whether an area analyzing processing and a character recognition processing are executed for the image by the transmitting apparatus;
   executing the area analyzing processing and the character recognition processing for the data based on the format of the data judged in said judging step; and
   outputting the data for which both the area analyzing processing and the character recognition processing have been executed,
   wherein said executing step includes executing both the area analyzing processing and the character recognition processing if it is judged in said judging step that the area analyzing processing and the character recognition processing are not executed for the data by the transmitting apparatus, and
   wherein said executing step includes executing the character recognition processing for the data if it is judged in said judging step that the area analyzing processing is executed for the data by the transmitting apparatus and the character recognition processing is not executed for the data by the transmitting apparatus.

2. An image processing method according to claim 1, further comprising the step of instructing the format of the transmitted data to the transmitting apparatus.

3. An image processing method according to claim 1, wherein the area analyzing processing extracts some areas from the image and binarizes the extracted area having text attribute.

4. An image processing method according to claim 1, wherein the received data is the data for which the area analyzing processing and the character recognition processing are not executed by the transmitting apparatus, or the data for which the area analyzing processing is executed and the character recognition processing is not executed by the transmitting apparatus, or the data for which both of the area analyzing processing and the character recognition processing are executed by the transmitting apparatus.

5. An image processing method according to claim 1, further comprising the step of correcting character codes of the result of the character recognition processing performed by the receiving apparatus according to a user instruction.

6. An image processing method according to claim 1, further comprising the step of correcting the result of the area analyzing processing performed by the receiving apparatus according to a user instruction.

7. A method of controlling a transmitting apparatus which processes an image, said method comprising the steps of:
   receiving an instruction of a data format issued from a receiving apparatus which is connected through a network;
   judging whether each of an area analyzing processing and a character recognition processing is to be executed for the image by the transmitting apparatus based on the received instruction of the data format;
   executing the area analyzing processing and the character recognition processing for the image based on the result in said judging step; and
   transmitting the data of the image to the receiving apparatus, the data of the image being the data processed in said executing step,
   wherein said executing step includes executing both of the area analyzing processing and the character recognition processing if it is judged in said judging step that both of the area analyzing processing and the character recognition processing are to be executed,
   wherein said executing step includes executing the area analyzing processing if it is judged in said judging step that the area analyzing processing is to be executed and the character recognition processing is not to be executed, and
   wherein, in said executing step, the area analyzing processing and the character recognition processing are not performed if it is judged in said judging step that both the area analyzing processing and the character recognition processing are not to be executed.

8. An image processing method according to claim 7, wherein the instruction received in said receiving step includes an instruction to read the image data; and
   said method further comprises the step, of starting the processing of reading the image data in accordance with the instruction to read the data.

9. An image processing method according to claim 7, wherein the area analyzing processing extracts some areas from the image and binarizes the extracted area having text attribute.

10. An image processing method according to claim 7, wherein the image is the image which has been read through a scanner.

11. An image processing receiving apparatus which processes an image, said apparatus comprising:
   reception means for receiving data of the image, the data being transmitted from a transmitting apparatus which is connected through a network;
   judgement means for judging a format of the data received by said reception means, the format indicating whether an area analyzing processing and a character recognition processing are executed for the image by said judgment means;
   processing means for executing the area analyzing processing and the character recognition processing for the data based on the format of the data judged by said judgement means; and
   output means for outputting the data for which both the area analyzing processing and the character recognition processing have been executed,
   wherein said processing means executes both the area analyzing processing and the character recognition processing if it is judged by said judgement means that the area analyzing processing and the character recognition processing are not executed for the data by the transmitting apparatus, and
   wherein said processing means executes the character recognition processing for the data if it is judged by said judgement means that the area analyzing processing is executed for the data by the transmitting apparatus and the character recognition processing is not executed for the data by the transmitting apparatus.

12. An image processing receiving apparatus according to claim 11, further comprising instruction means for instructing the format of the transmitted data to the transmitting apparatus.

13. An image processing receiving apparatus according to claim 11, wherein the area analyzing processing extracts some areas from the image and binarizes the extracted area having text attribute.

14. An image processing receiving apparatus according to claim 11, wherein the received data is the data for which the area analyzing processing and the character recognition processing are not executed by the transmitting apparatus, or the data for which the area analyzing processing is executed and the character recognition processing is not executed by the transmitting apparatus, or the data for which both of the area analyzing processing and the character recognition processing are executed by the transmitting apparatus.

15. An image processing receiving apparatus according to claim 11, further comprising character correction means for correcting character codes of the result of the character recognition processing preformed by said apparatus according to a user instruction.

16. An image processing receiving apparatus according to claim 11, further comprising correction means for correcting the result of the area analyzing processing performed by said apparatus according to a user instruction.

17. An image processing transmitting apparatus which processes an image, said apparatus comprising:
  instruction receiving means for receiving an instruction of a data format issued from a receiving apparatus which is connected through a network;
  judgement means for judging whether each of an area analyzing processing and a character recognition processing is to be executed for the image by said apparatus based on the received instruction of the data format;
  processing means for executing the area analyzing processing and the character recognition processing for the image based on the result from said judgement means; and
  transmission means for transmitting the data of the image to the receiving apparatus, the data of the image being the data processed by said processing means,
  wherein said processing means executes both of the area analyzing processing and the character recognition processing if it is judged by said judgement means that both of the area analyzing processing and the character recognition processing are to be executed,
  wherein said processing means executes the area analyzing processing if it is judged by said judgement means that the area analyzing processing is to be executed and the character recognition processing is not to be executed, and
  wherein said processing means does not execute the area analyzing processing and the character recognition processing if it is judged by said judgement means that both the area analyzing processing and the character recognition processing are not to be executed.

18. An image processing transmitting apparatus according to claim 17, wherein the instruction received by said instruction receiving means includes an instruction to read the image data, and
  said apparatus further comprises reading means for starting to read the image data in accordance with the instruction to read the data.

19. An image processing transmitting apparatus according to claim 17, wherein the area analyzing processing extracts some areas from the image and binarizes the extracted area having text attribute.

20. An image processing transmitting apparatus according to claim 17, wherein the image is the image which has been read from a scanner.

21. An image processing system comprising a receiving apparatus and a transmitting apparatus connected through a network,
  said transmitting apparatus comprises:
    first judgement means for judging whether each of an area analyzing processing and character recognition processing is to be executed for an image by said transmitting apparatus based on an instruction issued from said receiving apparatus;
    first execution means for executing the area analyzing processing and the character recognition processing for the image based on the result from said first judgement means; and
    transmission means for transmitting the data of the image to said receiving apparatus, wherein the data of the image is the data processed by said first execution means,
    wherein said first execution means executes both of the area analyzing processing and the character recognition processing if said first judgement means judges that both of the area analyzing processing and the character recognition processing are to be executed,
    wherein said first execution means executes the area analyzing processing if said first judgement means judges that the area analyzing processing is to be executed and the character recognition processing is not to be executed, and
    wherein said first execution means does not execute both of the area analyzing processing and the character recognition processing if said first judgement means judges that both of the area analyzing processing and the character recognition processing are not to be executed; and
  said receiving apparatus comprises:
    reception means for receiving the data of the image, the data being transmitted by said transmitting means of said transmitting apparatus;
    second judgement means for judging a format of the data received by said reception means, the format indicates whether the area analyzing processing and the character recognition processing are executed for the image by said transmitting apparatus;
    second execution means for executing the area analyzing processing and the character recognition processing for the data based on the format of the data judged by said second judgement means;
    output means for outputting the data for which both of the area analyzing processing and the character recognition processing have been executed,
    wherein said second execution means executes both the area analyzing processing and the character recognition processing if said second judgement means judges that the area analyzing processing and the character recognition processin are not executed for the data by said transmitting apparatus, and
    wherein said second execution means executes the character recognition processing for the data if said second judgement means judges that the area analyzing processing is executed for the data by the transmitting apparatus and the character recognition processing is not executed for the data by said transmitting apparatus.

22. An image processing system according to claim 21, wherein the area analyzing processing extracts some areas from the image and binarizes the extracted area having text attribute.

23. An image processing system according to claim 21, wherein said receiving apparatus further comprises character correction means for correcting character codes of the result of the character recognition processing performed by said receiving apparatus according to a user instruction.

24. An image processing system according to claim 21, wherein said receiving apparatus further comprises area correcting means for correcting the result of the area analyzing processing performed by said receiving apparatus according to a user instruction.

25. An image processing system according to claim 21, wherein said transmitting apparatus starts the processing of reading the image data in accordance with an instruction issued by said receiving apparatus.

26. An image processing system according to claim 21, wherein the area analyzing processing extracts some areas from the image and binarizes the extracted area having text attribute.

27. An image processing system according to claim 21, wherein the transmitting apparatus further comprises a scanner for reading the image.

28. A storage medium for storing an image processing control program which executes a method of controlling a receiving apparatus which processes an image, said image processing control program comprising the steps of:

receiving data of the image, the data being transmitted from a transmitting apparatus which is connected through a network;

judging a format of the data received in said receiving step, the format indicating whether an area analyzing processing and a character recognition processing are executed for the image by the transmitting apparatus;

executing the area analyzing processing and the character recognition processing for the data based on the format of the data judged in said judging step; and outputting the data for which both the area analyzing processing and the character recognition processing have been executed, wherein said executing step includes executing both the area analyzing processing and the character recognition processing if it is judged in said judging step that the area analyzing processing and the character recognition processing are not executed for the data by the transmitting apparatus, and wherein said executing step includes executing the character recognition processing for the data if it is judged in said judging step that the area analyzing processing is executed for the data by the transmitting apparatus and the character recognition processing is not executed for the data by the transmitting apparatus.

29. A storage medium according to claim 28, said method further comprising the step of instructing the format of the transmitted data to the transmitting apparatus.

30. A storage medium according to claim 28, wherein the area analyzing processing extracts some areas from the image and binarizes the extracted area having text attribute.

31. A storage medium according to claim 28, wherein the received data is the data for which the area analyzing processing and the character recognition processing are not executed by the transmitting apparatus, or the data for which the area analyzing processing is executed and the character recognition processing is not executed by the transmitting apparatus, or the data for which both of the area analyzing processing and the character recognition processing are executed by the transmitting apparatus.

32. A storage medium according to claim 28, said method further comprising the step of correcting character codes of the result of the character recognition processing performed by the receiving apparatus according to a user instruction.

33. A storage medium according to claim 28, said method further comprising the step of correcting the result of the area analyzing processing performed by the receiving apparatus according to a user instruction.

34. A storage medium for storing an image processing control program which executes a method of controlling a transmitting apparatus which processes an image, said image processing control program comprising the steps of:

receiving an instruction of a data format issued from a receiving apparatus which is connected through a network;

judging whether each of an area analyzing processing and a character recognition processing is to be executed for the image by the transmitting apparatus based on the received instruction of the data format;

executing the area analyzing processing and the character recognition processing for the image based on the result in said judging step; and transmitting the data of the image to the receiving apparatus, the data of the image being the data processed in said executing step, wherein said executing step includes executing both of the area analyzing processing and the character recognition processing if it is judged in said judging step that both of the area analyzing processing and the character recognition processing are to be executed, wherein said executing step includes executing the area analyzing processing if it is judged in said judging step that the area analyzing processing is to be executed and the character recognition processing is not to be executed, and wherein said executing step does not execute the area analyzing processing and the character recognition processing if it is judged in said judging step that both the area analyzing processing and the character recognition processing are not to be executed.

35. A storage medium according to claim 34, wherein the instruction received in said receiving step includes an instruction to read the image data, and said image processing control program further comprises the step of starting to read the image data in accordance with the instruction to read the data.

36. A storage medium according to claim 34, wherein the area analyzing processing extracts some areas from the image and binarizes the extracted area having text attribute.

37. A storage medium according to claim 34, wherein the image is the image which has been read from a scanner.

* * * * *

UNITED STATES PATENT AND TRADEMARK OFFICE
CERTIFICATE OF CORRECTION

PATENT NO. : 6,930,789 B1
APPLICATION NO. : 09/545196
DATED : August 16, 2005
INVENTOR(S) : Junichiro Kizaki It is certified that error appears in the above-identified patent and that said Letters Patent is hereby corrected as shown below:

ON TITLE PAGE AT (57) ABSTRACT

Line 9, "execute" should read --executed--.

COLUMN 1

Line 9, "when" should read --device--;
    Line 12, "of" should be deleted;
    Line 13, "reader" should read --reader,--;
    Line 14, "network" should read --network,--;
    Line 15, "image" should read --image and--;
    Line 16, "the case of" should be deleted;
    Line 21, "a" should read --the--;
    Line 22, "recognizing" should read --previously recognizing--;
    Line 23, "previously" should be deleted;
    Line 24, "image, and for the area" should read --image.--;
    Line 29, "small" should read --smaller--;
    Line 34, "small" should read --smaller--;
    Line 38, "judgement" should read --judgment--;
    Line 38, "can not" should read --cannot--; and
    Line 53, "a" should read --an--.

COLUMN 2

Line 1, "processings" should read --processings,--;
    Line 55, "apparatus" should read --apparatus,--; and
    Line 57, "executed" should read --executed,--.

COLUMN 3

Line 7, "where" should read --which--;
    Line 13, "that" should read --for which--; and
    Line 33, "patient" should read --patent--.

UNITED STATES PATENT AND TRADEMARK OFFICE
CERTIFICATE OF CORRECTION

PATENT NO. : 6,930,789 B1
APPLICATION NO. : 09/545196
DATED : August 16, 2005
INVENTOR(S) : Junichiro Kizaki It is certified that error appears in the above-identified patent and that said Letters Patent is hereby corrected as shown below:

COLUMN 4

Line 17, "will" should read --will be--;
Line 23, "chart" should read --chart,--;
Line 24, "later" should read --later,--;
Line 25, "PMEM 3, in addition thereto," should read --PMEM 3--; and
Line 35, "lines" should read --line--.

COLUMN 5

Line 14, "reading optically" should read --optically reading--;
Line 24, "respectively" should be deleted;
Line 34, "softwares" should read --software--;
Line 35, "the" should be deleted;
Line 39, "O-APT" should read --O-PAF--.
Line 52, "321" should read --321,--; and
Line 54, "stored" should read --stored,--.

COLUMN 6

Line 7, "410" should read --410,--;
Line 8, "area includes" should read --area, includes--;
Line 35, "the" should read --an--;
Line 39, "bloc," should read --block,--;
Line 39, "well known" should read --well-known--; and
Line 64, "16" should read --16,--.

COLUMN 7

Line 1, "is" should read --are--;
Line 2, "it is" should read --and therefore it is--;
Line 6, "chat" should read --chart--;
Line 12, "data existing" should read --existing data--;
Line 18, "texts are" should read --text is--;
Line 21, "unit" should read --until--;
Line 41, "nected" should read --nected,--;
Line 46, "201." should read --1201.--;
Line 58, "I-APF" should read --I-PAF--; and
Line 66, "which" should read --which,--.

UNITED STATES PATENT AND TRADEMARK OFFICE
CERTIFICATE OF CORRECTION

PATENT NO. : 6,930,789 B1
APPLICATION NO. : 09/545196
DATED : August 16, 2005
INVENTOR(S) : Junichiro Kizaki It is certified that error appears in the above-identified patent and that said Letters Patent is hereby corrected as shown below:

COLUMN 8

Line 3, "part the data" should read --data part--;
Line 8, "rereading" should read --reading--;
Line 25, "format" should read --format,--;
Line 26, "processings" should read --processing--;
Line 31, "as well" should be deleted;
Line 34, "carry out again" should read --again carry out--;
Line 51, "carriers" should read --carries--; and
Line 67, "connected" should read --connected,--.

COLUMN 9

Line 14, "as the" should read --into--;
Line 27, "up to" should be deleted;
Line 41, "other" should read --another--; and
Line 57, "computer" should read --computers--.

COLUMN 10

Line 12, "made by" should read --of--;
Line 27, "generate" should read --generated--;
Line 34, "s" should read --as--; and
Line 50, "to" should be deleted.

COLUMN 12

Line 45, "judgement" should read --judgment--;
Line 51, "judgement" should read --judgment--; and
Line 57, "judgement" should read --judgment--.

COLUMN 13

Line 15, "preformed" should read --performed--;
Line 26, "judgement" should read --judgment--;
Line 33, "judgement" should read --judgment--;
Line 40, "judgement" should read --judgment--;
Line 44, "judgement" should read --judgment--; and
Line 50, "judgement" should read --judgment--.

UNITED STATES PATENT AND TRADEMARK OFFICE
CERTIFICATE OF CORRECTION

PATENT NO. : 6,930,789 B1
APPLICATION NO. : 09/545196
DATED : August 16, 2005
INVENTOR(S) : Junichiro Kizaki It is certified that error appears in the above-identified patent and that said Letters Patent is hereby corrected as shown below:

<u>COLUMN 14</u>

Line 4, "judgement" should read --judgment--;
    Line 12, "judgement" should read --judgment--;
    Line 20, "judgement" should read --judgment--;
    Line 25, "judgement" should read --judgment--;
    Line 30, "judgement" should read --judgment--;
    Line 39, "judgement" should read --judgment--;
    Line 47, "judgement" should read --judgment--;
    Line 53, "judgement" should read --judgment--;
    Line 55, "processin" should read --processing--; and
    Line 59, "judgement" should read --judgment--.

Signed and Sealed this

Nineteenth Day of February, 2008

JON W. DUDAS
*Director of the United States Patent and Trademark Office*